W. M. WAUTERS.
AUTOMATIC BOX MAKING MACHINE.
APPLICATION FILED JUNE 10, 1914.

1,179,589.

Patented Apr. 18, 1916.
8 SHEETS—SHEET 1.

W. M. WAUTERS.
AUTOMATIC BOX MAKING MACHINE.
APPLICATION FILED JUNE 10, 1914.

1,179,589.

Patented Apr. 18, 1916.
8 SHEETS—SHEET 2.

Witnesses:
Robert E. Samuels.
John Jessich.

Inventor
William M. Wauters
By his Attorney

W. M. WAUTERS.
AUTOMATIC BOX MAKING MACHINE.
APPLICATION FILED JUNE 10, 1914.

1,179,589.

Patented Apr. 18, 1916.
8 SHEETS—SHEET 3.

W. M. WAUTERS.
AUTOMATIC BOX MAKING MACHINE.
APPLICATION FILED JUNE 10, 1914.

1,179,589.

Patented Apr. 18, 1916.
8 SHEETS—SHEET 5.

UNITED STATES PATENT OFFICE.

WILLIAM M. WAUTERS, OF BAYONNE, NEW JERSEY.

AUTOMATIC BOX-MAKING MACHINE.

1,179,589.

Specification of Letters Patent. Patented Apr. 18, 1916.

Application filed June 10, 1914. Serial No. 844,133.

*To all whom it may concern:*

Be it known that I, WILLIAM M. WAUTERS, a citizen of the United States, and a resident of Bayonne, in the county of Hudson and State of New Jersey, have invented certain new and useful Improvements in Automatic Box-Making Machines, of which the following is a specification.

This invention relates to an automatic box making machine, which essentially comprises three units or general parts designated by the letters A, B and C. These units coact to respectively nail together the members of the boxes produced by the machine. First the ends and a side of each box are nailed together, after which the opposite side is nailed to said ends and finally the bottom of the box is nailed in place.

Essential and novel features of the invention comprise means that suspend the movements of some of the elements during any disarrangement of coacting elements.

Referring to the drawings

Figures 4, 5, 6, 7:
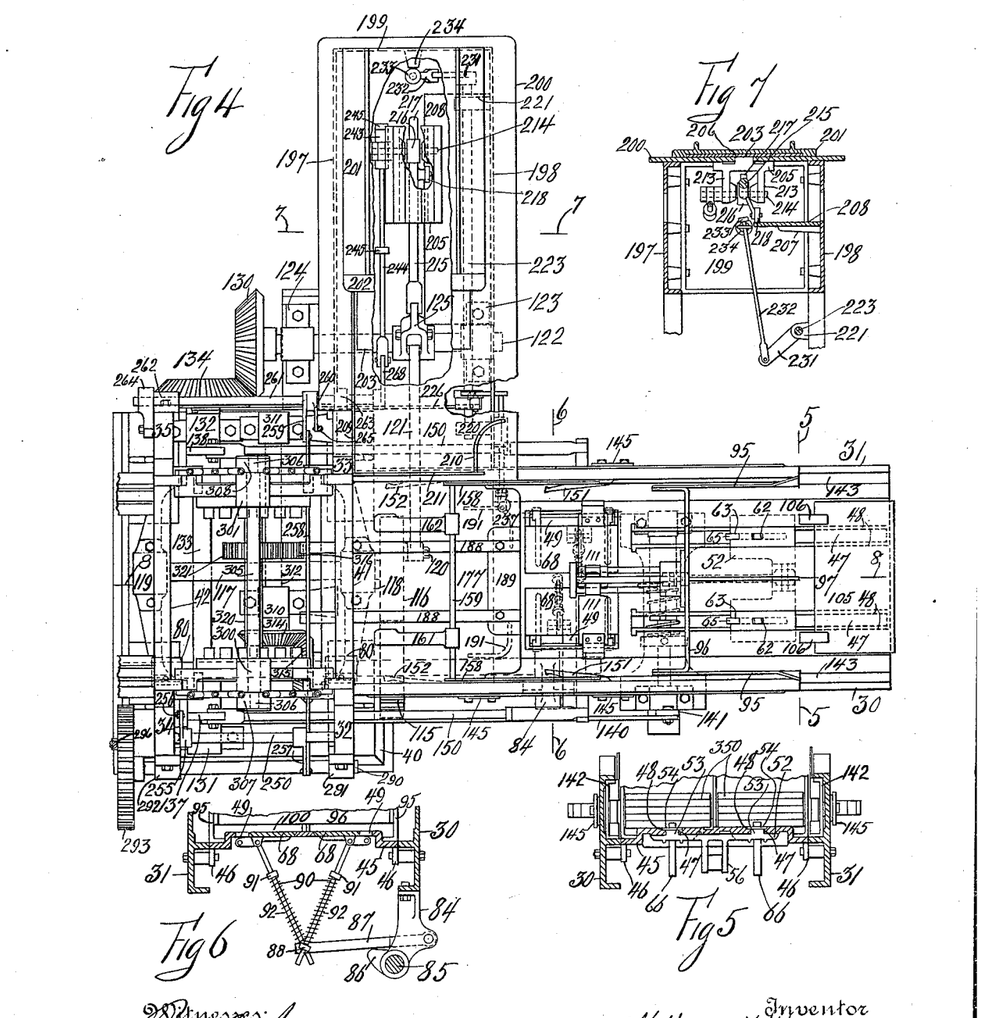
Fig. 4 is an enlarged partial top plan view of the charging end of the machine.
Fig. 5 shows a fragmentary section of Fig. 4 on the line 5, 5.
Fig. 6 is a fragmentary section of Fig. 4 on the line 6, 6.
Fig. 7 shows a section of Fig. 4 on the line 7, 7.

The first unit A is shown to comprise the horizontal sides 30, 31 which are respectively connected to the vertical guide columns 32 and 33 and supported on the end bracket 29. A second pair of guide columns are indicated at 34 and 35. A plate 36 connects the columns 32 and 34 and a plate 37 connects the columns 33 and 35. The plate 36 has formed therewith the lug 38 and the plate 37 has formed therewith a similar lug 39. The columns 32 and 35 are bolted to and supported on the bed plate 40. A cross brace 41 connects the columns 32 and 33 and a cross brace 42 connects the columns 34 and 35. A table 45 has extending therefrom the lugs 46 which are bolted to the horizontal sides 30 and 31. The table 45 has formed therein the longitudinal grooves 47 shouldered at 48 and the openings 49 (Fig. 6). An end feeding cross-head 52 has extending from its upper surface guide lugs 53, that are located in the grooves 47 (Fig. 5). Plates 54 fit in the shoulders 48 and are fastened to said guide lugs 53. A bifurcated lug 56 extends from the cross head 52 and has pivoted thereto one end of the link 57 (Fig. 8). The cross head 52 has formed therein the openings 62 and notches 63. Dogs 64 with the pusher ends 65 and the weighted ends 66 are pivoted to the cross head 52 in the openings 62. The pusher ends 65 can swing up through the notches 63 (Fig. 6). In the openings 49 of the table 45 are hinged tipping doors 68.

A journal bracket 70 has journaled therein the oscillating shaft 71 to which latter is fastened the arm 72 carrying the locking pin 73. The upper end of the arm 72 is pinned to one end of the link 57. A collar 74 is fastened to the shaft 71 and a sleeve 75 with the lug 76 is slidably supported on said shaft, by means of the spline 77. The locking pin 73 is positioned to engage a cavity 78 in the lug 76 (Fig. 14), thereby locking the arm 72 with the lug 76. During the oscillations of the shaft to be described the arm 72 oscillates by virtue of which the end feeding cross-head 52 is reciprocated.

Journal bearings 80 in the columns 32 and 34 support the main driving shaft 85. A journal bracket 84 is bolted to the lower face of the horizontal side 30, and in which is journaled one end of the main driving shaft 85. The shaft 85 has fastened thereto the cam 86 (Fig. 6). A lever 87 has one end pivoted to the bracket 84, and at about its central part is in the path of the cam 86, so as to be oscillated by the latter, when the shaft 85 turns. Lugs 88 are pivoted upon the opposite sides of the lever 87 and slidingly guide one end each of the spring actuated links 90. The upper end of each link 90 is pinned to one of the doors 68. A collar 91 is fastened to each one of the links 90 and a spring 92 bears between the collar 91 and the lug 88. During the oscillations of the levers 87, the doors 68 are moved to tip them up and down. Guide plates 94 (Fig. 9) extend up from the table 45.

Figures 8, 9, 10, 11, 12, 13:
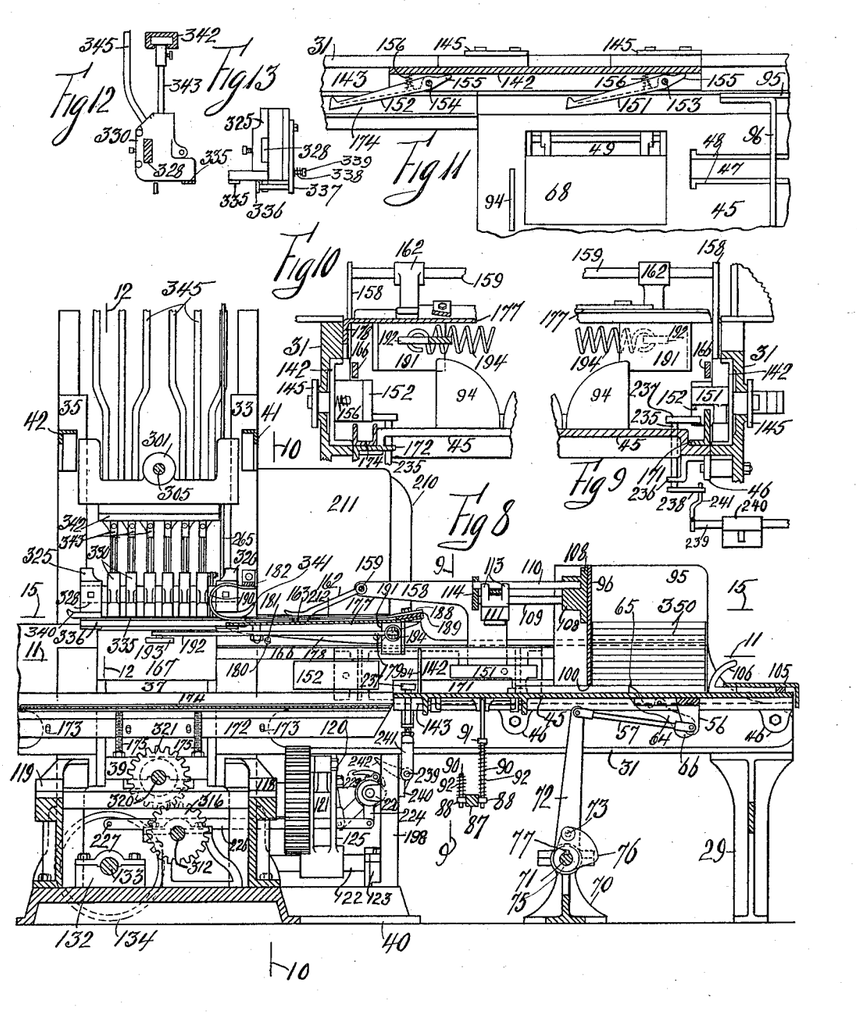
Fig. 8 represents a partial section of Fig. 4 about on the line 8, 8.
Fig. 9 shows a fragmentary enlarged section of Fig. 8 on the line 9, 9.
Fig. 10 represents a fragmentary enlarged section of Fig. 8 on the line 10, 10.
Fig. 11 shows an enlarged fragmentary section of Fig. 8 on the line 11, 11.
Fig. 12 is a fragmentary enlarged section of Fig. 8 on the line 12, 12.
Fig. 13 shows a detail of Fig. 8.
Figures 14, 15, 16, 17:
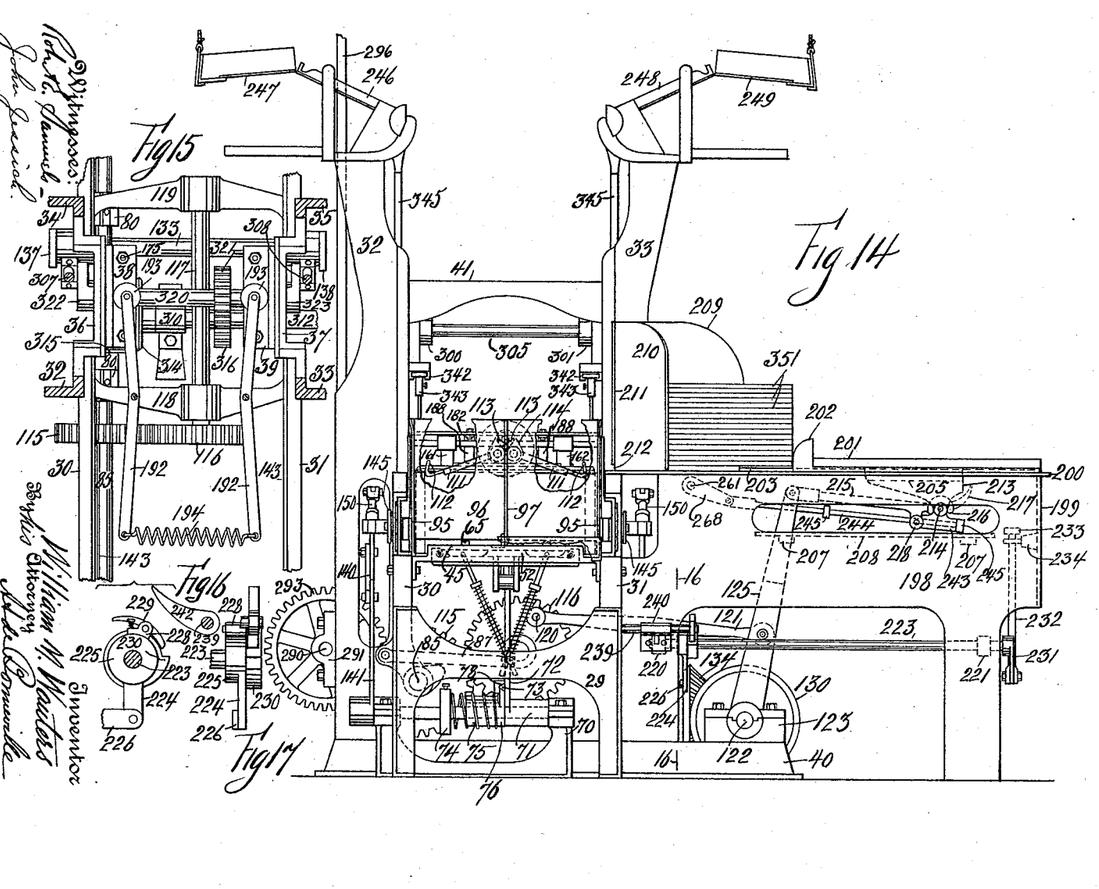
Fig. 14 shows an enlarged right hand end view, partly broken away of Fig. 1.
Fig. 15 represents an enlarged fragmentary view as on the line 15, 15 of Fig. 8.
Fig. 16 shows an enlarged fragmentary section of Fig. 14 on the line 16, 16.
Fig. 17 shows a right hand end view of Fig. 16.

Upon the table 45 is supported a charging hopper comprising the sides 95, the cross wall 96 and the longitudinal partition 97. A feed opening 100 is formed between the lower edge of cross wall 96 and the table 45. An apron 105 with a feeding guide 106 is located over the table 45. A support 108 is fastened to the cross wall 96 and has extending therefrom the lower hinge pins 109 and upper stop pin 110 (Fig. 8). Swinging guide arms 111 with the curved guide ends 112 and toes 113 are pivoted to the pins 109 (Fig. 14). The toes 113 (Figs. 8 and 14) abut against the stop pin 110 when the arms 111 are in their elevated positions. A supporting plate 114 connects the pins 109 and 110.

The main driving shaft 85 carries the spur gear 115 which meshes with the spur gear 116 fastened to the short longitudinal shaft 117 (Fig. 15). The shaft 117 is supported in journaled brackets 118, 119 which are respectively fastened to the columns 32, 33 and 34, 35. A wrist pin 120 (Fig. 14) on the gear 116 supports one end of the connecting rod 121. A second short longitudinal shaft 122 is supported in supporting boxes 123, 124. An arm 125 has one end fastened to the shaft 122. One end of the connecting rod 121 is pinned to the arm 125. A bevel gear 130 is fastened to one end of the shaft 122. Supporting boxes 131, 132 have supported therein the short cross-shaft 133. A bevel gear 134 fastened to the shaft 133 meshes with the bevel gear 130. By means of the gearing interposed between the main shaft 85 and the shafts 122 and 133 an oscillating movement is given to the two latter shafts from the rotations of the former. Levers 137, 138 have each one end fastened to the cross shaft 133. A link 140 (Fig. 4) has one end pinned to the lever 137, and its other end is pinned to an arm 141 extending from the shaft 71, and thereby an oscillating movement is transmitted from the shaft 133 to the shaft 71. Cross heads 142 bear on shelves 143 formed with the horizontal sides 30 and 31. The cross heads 142 have projections that extend through the longitudinal openings 144 of the sides 30 and 31. Plates 145 (Figs. 9 and 10) are bolted to said projections to maintain the cross-head 142 laterally in position. Connecting rods 150 (Figs. 3 and 4) have each one end pinned to one of the arms 137 and the other end of each of the said connecting rods is pinned to one of the cross-heads 142.

On each of the cross-heads 142 are pivoted the vertical pushers 151, 152, by means of the pins 153, 154 (Fig. 11). Heels 155 of the said pushers can abut against their respective cross-heads, and springs 156 bear between said pushers and said cross-heads. Each of the cross-heads 142 carry an angle shaped arm 158 (Figs. 8, 9 and 10) that carry the cross rod 159. Pushers 161 and 162 are hinged to the cross-rod 159. Each of the pushers 161, 162 has extending from its lower surface a toe 163. The said toes are in line with the ends of the pushers 152. A pair of guide bars 166 have each one end fastened to each one of the columns 32, 33 and the other ends thereof are fastened to the sides 95 of the charging hopper. Guide plates 167 are fastened to the plates 36 and 37 in line with the guide bars 166. A pair of angle irons 171 are fastened to the table 45, and a pair of angle irons 172 are fastened to the horizontal sides 30 and 31 by means of screws extending through elongated openings 173. A pair of channel irons 174 are fastened to the angle irons 172. Screws 175 extend from the lugs 38 and 39 and adjustably support the angle irons 172. A hood with the crown 177 and the sides 178 is pivoted to the horizontal sides 30 and 31, by means of the screws 179. A supporting bar 180 (Fig. 8) has the eccentric ends 181, which latter are supported in the sides 30 and 31. By means of the bar 180 the hood with the crown 177, can be tipped to different positions. The screws 179 support the sides 178 of the hood having the crown 177.

A supporting bar 182 is fastened to and extends between the columns 32 and 33. Spring guide bars 188 have each one end bearing on a separator 189 located upon the crown 177 of the said hood. The other ends of the bars 188 are curved as indicated at 190 and are fastened to the supporting bar 182. The separators 189 separate the boss 188 from the crown 177 to enable boards to pass between them. Curved guide lugs 191 extend from the lower face of the crown 177. A pair of separator arms 192 are pivoted to the crown 177 and have each journaled at one of their ends the guide rollers 193. The other ends of the arms 192 are connected by the spring 194. The arms 192 with their rollers 193 maintain the boards that bear against said rollers in proper upright positions.

A cross feed mechanism is shown with a feed table having the sides 197, 198 and the end wall 199, and upon which is mounted the table plate 200 (Figs. 4 and 14). A hood 201 with the apron 202 is fastened to the table plate 200, and is concaved from its lower face for the pusher plate 203. A cross head 205 extends from the pusher plate 203 passing through a guide opening 206 (Fig. 7) in the table plate 200. Lugs 207 extend from the side 198 of the cross feed table and have mounted thereon the guide plate 208. On the table plate 200 is located a hopper with the side plates 209 and 210, the latter being curved as shown. An end plate 211 forming an opening 212 with the table plate 200 is connected to the side plates 209 and 210.

With the cross head 205 are formed the lugs 213 which support a pin 214. At the upper end of the arm 125 is pinned one end of the link 215 with the hook end 216 with the prong 217. A roller 218 is journaled on the link 215. The hook end 216 normally engages the pin 214 of the cross head 205.

With the side 198 are formed bearings 220 and 221 (Fig. 14) in which is journaled the shaft 223 on which latter is loosely mounted a lever 224, having the boss 225 (Figs. 16 and 17). A link 226 connects the lower end of the lever 224 with a pin 227 (Fig. 8) on the bevel gear 134. A lug 228 extends from the boss 225 and the latter has pivoted thereto a spring latch 229. A heel 230 is fastened to the shaft 223 and can be engaged by the latch 229, so that an oscillating movement can be transmitted from the bevel gear 134 to the shaft 223 when the latch 229 engages the heel 230. An arm 231 (Fig. 7) has one end fastened to the shaft 223, and to the swinging end of said arm is pinned the plunger 232 having the cap 233. The plunger 232 is guided in the guide bracket 234 extending from the end wall 199. The plunger 232 is in the path of the prong 217. A spindle 235 is guided in the table 45 and bracket 236 extending from said table (Fig. 9). A regulating finger 237 extends from the top end of the spindle 235. One end of a lever 238 is fastened to the spindle 235. A rock shaft 239 is fulcrumed in a bearing 240 that extends from the side 198. An arm 241 extending from the shaft 239 is connected to one end of the lever 238. A finger 242 (Fig. 16) is also fastened to the shaft 239 and its swinging end is in the path of the spring latch 229.

An oscillating bearing 243 is supported on the pin 214 and slidably carries the plunger 244. Stop collars 245 are fastened to the plunger 244 (Fig. 14).

A nail feeder 246 with the oscillating feed pan 247 is mounted on the columns 32, 34 and a nail feeder 248 with the oscillating feed pan 249 is mounted on the columns 33 and 35. A short horizontal shaft 250 is supported in bearings extending from the columns 32, and 34. An arm 255 is fastened to the shaft 250 (Fig. 1) and has one end of the vertical link 256 pinned thereto, the other end of which latter is connected to the mechanism (not shown) of the nail feeder 246. A second arm 257 is fastened to the shaft 250 and has fastened thereto one end of the horizontal link 258, the other end of which is fastened to the arm 259 (Fig. 4) of a bell crank which has a second arm 260. The said bell crank is fastened to the shaft 261 and is supported in the bearings 262 and 263. A friction block 264 is supported on the column 35 and tightly clamps one end of the shaft 261. A vertical link 265 has one end pinned to the arm 260 and the other end of the latter link is connected to the mechanism (not shown) of the nail feeder 248. An arm 268 is fastened to the shaft 261 and has pinned thereto one end of the plunger 244.

An oscillating shaft 275 (Figs. 1 and 2) is supported in shaft hangers 276. An arm 277 is fastened to the shaft 275 and has connected thereto one end each of the ropes 280 and 281. A pulley 282 is journaled in a hanger 283 and a pulley 284 is journaled in the hanger 285. The rope 280 extends over the pulley 282 and has one end fastened to the oscillating feed pan 247. The rope 281 extends over the pulley 284 and has one end fastened to the oscillating feed pan 249. A shaft 290 (Figs. 1 and 14) is journaled in journal boxes 291 and 292 supported respectively on the columns 32 and 34. A spur gear 293 is fastened to the shaft 290, and meshes with the spur gear 294 on the main driving shaft 85. An arm 295 is fastened to the oscillating shaft 275 and has pinned thereto one end of the vertical link 296, the other end of which latter is pinned to the spur gear 293.

A cross head 300 is guided in the columns 32 and 34 and a cross head 301 is guided in the columns 33 and 35. A shaft 305 connects the said cross heads 300 and 301, and has formed at its ends eccentric bearings 306 for the upper ends of the connecting rods 307 and 308.

A pair of journal bearings 310 and 311 (Fig. 4) are supported on the bed plate 40 and have journaled therein the shaft 312. A bevel gear 314 on the shaft 312 meshes with the bevel gear 315 on the main shaft 85. A spur gear 316 is fastened to the shaft 312. In the lugs 38 and 39 are formed bearings for the shaft 320, that has fastened thereto the spur gear 321 which meshes with the spur gear 316. Arms 322, 323 (Fig. 15), are fastened to the shaft 320 and have their outer ends pinned respectively to the connecting rods 307 and 308.

A pair of slides 325 and 326 (Fig. 8) are guided respectively on the columns 32, 34 and on the columns 33, 35. Each pair of slides are connected by a cross bar 328, and the latter have fastened thereto the series of nail holders 330. Guide strips 335 bear up against the lower surface of each series of nail holders 330 and are fastened at their ends to the pair of slides 325 and 326, constituting floating guides for the side and ends of the boxes to be made. Guide strips 336 are connected to the slides 325 and 326. One of the guide strips 336 is securely fastened to the slides 325 and 326, while the other guide strip 336 is fastened to the angle shaped levers 337 (Fig. 13) that are pivoted to the slides 325, 326. Springs 338 on pins 339 bear against the angle shaped lever 337. By this means the ends and sides of the boxes are adjustably guided. Guides 340 and 341 extend from each of the slides 325 and 326 and are connected to the guide strip 335. A channel bar 342 is fastened to each cross head 300 and 301 and from which are suspended the punches 343. The lower ends of the punches 343 enter the nail holders 330. Nail feeding conduits 345 extend from the nail feeders 246, 248 and connect with the nail holders 330.

To operate the machine as far as described two stacks or series of boards 350 of the requisite dimensions are placed in the charging hopper, one stack located on each side of the partition 97. The main shaft 85 is rotated by means to be described subsequently. With the rotations of the shaft 85, the spur gear 115 is rotated which turns the gear 116, and with the latter the shaft 117 is turned. The gear 116 oscillates the connecting rod 121 and with the latter the arm 125 is caused to oscillate. The shaft 122 and the gear 130 oscillate with the arm 125. The gear 134 with the shaft 133 is oscillated by the gear 130. The arms 137 and 138 are oscillated with the shaft 133. The link 140 is reciprocated with the oscillations of the arm 137, and thereby the shaft 71 with the arm 141 is oscillated. The shaft 71 oscillates the arm 72 and by means of the link 57 the end feeding cross head 52 receives its reciprocations. With the reciprocations of the cross head 52, the pusher ends 65 of the dogs 64 carry with each forward stroke one of the boards 350 through the feed opening 100 and lands a pair of said boards on the tipping door 68. In case the boards 350 which form the ends of the box to be made in any way interfere with the cross head 52 meshing its full stroke, the locking pin 73 disengages from the cavity 78 in the lug 79 and the shaft 71 is permitted to oscillate while the said cross head remains stationary.

The rotations of shaft 85 with the cam 86 causes the lever 87 to swing, and thereby the tipping doors 68 are tipped through the intervention of the links 90, and the springs 92 thereon. In case of any disarrangement of the boards on the said doors, or if for any other reason the doors cannot be tipped, the springs 92 will compress and allow the lever 87 to swing, while the doors remain inoperative. By reason of the tipping of the doors 68 the boards 350 are brought from horizontal to vertical positions. While the boards are tipped from a horizontal to a vertical position their upper ends are engaged by the swinging guide arms 111, while their forward ends are guided by the guide strips 94, and after they pass said arms are vertically held in place as indicated in Fig. 5. The boards 350 are next engaged by the fingers 151 and horizontally moved, to be located in proper position opposite the end of the pusher plate 203 under the crown 177 of the hood, the latter swinging on the screws 179 in case the end boards 350 are irregular in height. The fingers 151 are horizontally moved by reason of the reciprocations of the cross heads 142. The latter are moved by reason of the oscillations of the arms 137, and the movements of the connecting rods 150. Upon the return strokes of the cross heads 142, that is to say toward the charging end of the machine, the pusher plate 203 moves one of the sides 351 (see Fig. 2) in proper position over the ends 350. The pusher plate 203 reciprocates with the cross head 205. The cross head 205 receives its movements by virtue of the hook end 216 of the link 215 engaging the pin 214. The link 215 is moved by reason of the oscillations of the arm 125. On the next forward stroke of the cross heads 142 the end boards 350 are engaged by the vertical pushers 152 and are brought under and below the guide strips 335, being guided in the channel irons 174. At the same time the pushers 161 and 162 engage the side boards 351 to locate them over the end boards 350. The end boards 350 on one side during their movements strike the regulating finger 237 which causes the finger 242 to engage the spring latch 229, and therefore the spring latch 229 does not actuate the heel 230. The shaft 223 is then not oscillated and the plunger 232 is not raised and the hook end 216 remains locked with the pin 214. Thereby the actuating mechanism of the pusher plate 203 is not disturbed. In case no end board 350 is fed to engage the regulating finger 237, the spring latch 229 engages the heel 230, and the shaft 223 is oscillated. This causes the plunger 232 to disengage the hook end 216 from the pin 214 and thereby the link 215 reciprocates while the cross head 205 remains stationary. The roller 218 now bears on the guide plate 208. By these means none of the side boards 351 are moved during the cessations of the movements of the end boards 350.

When both the series of boards 350 and 351 are brought under the guide strips 335 they are in proper position for the punches to nail one of the sides to a pair of ends.

During the return strokes of the oscillating bearing 243, the latter strikes the collar 245, and thereby the arm 268 is swung, which oscillates the shaft 261. By means of the oscillations of the shaft 261, the vertical links 256 and 265 are moved, and the latter operate the mechanism of the nail feeders 246 and 248. The nails are then allowed to drop through the nail feeding conduits 345 and reach the nail holders 330. The reciprocations of the cross heads 300 and 301 cause the punches 341 to hammer the nails so that a pair of ends 350 and a side 351 are nailed together.

When the cross head 205 does not reciprocate, the oscillating bearing 243 remains stationary and the nail feeding mechanism remains inoperative.

Figures 1, 2:
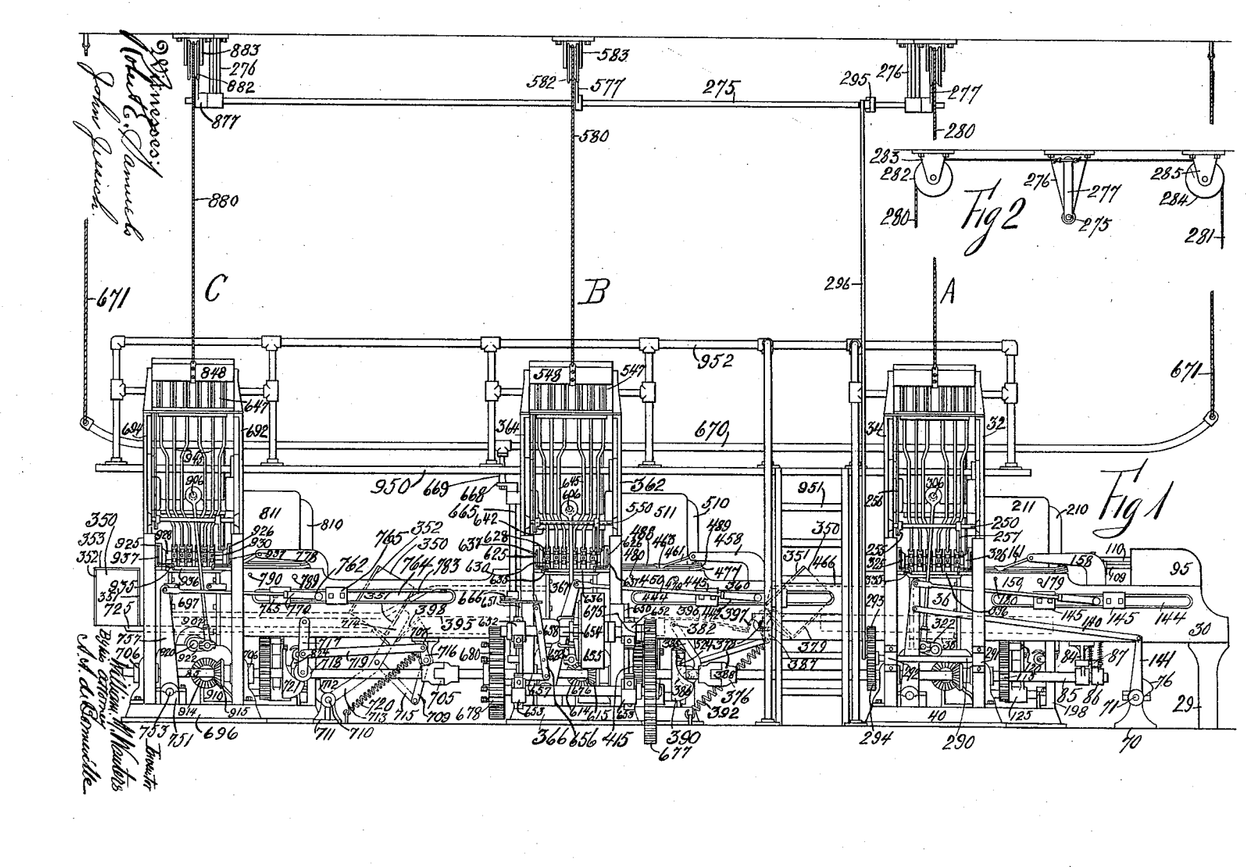
Figure 1 represents a side elevation of the box making machine exemplifying the invention.
Fig. 2 is a right hand side view of some details of Fig. 1.

The second unit indicated in its entirety by the letter B is shown with the horizontal sides 360, 361 (Fig. 18) similar to 30 and 31 which are respectively connected to the guide columns 34 and 35. The sides 360, 361 at their other ends are respectively connected to guide columns 362, 363 similar to 32 and 33. A fourth pair of guide columns are indicated at 364, 365. The columns 362 to 365 are bolted to a bed plate 366. A plate 367 similar to 36 connects the columns 362, 364 and a plate not shown similar to 37 connects the columns 363 and 365. A cross brace 371 connects the columns 362 and 363, and a cross brace 372 connects the columns 364, 365. The shaft 85 is continued for the second unit B by means of the coupling 376. (Fig. 1).

Journal brackets 377 are connected to the sides 360, 361 and support a rock shaft 378 having extending therefrom the turning fingers 379 and 380. A rock shaft 382 is journaled in sides 360, 361 and has fastened thereto the bifurcated arm 385, in the lower end of which latter is journaled the roller 386. An arm 387 extends from the rock shaft 378 and a link 388 has its ends pinned to the arms 385 and 387. A cam 390 on the shaft 85 engages the roller 386. A spring 392 extends between the arm 387 and the floor. A pair of angle irons 395 are fastened to the horizontal sides 360 and 361. The vertical flange of each of the latter angle irons is cut away leaving the horizontal flange 396, which is bent down at its forward end for the curved guide 397. The rear ends of each of the angle irons 395 also have their vertical flanges cut away, and the remaining horizontal flanges 398 are bent down as indicated, forming inclined guides. The angle irons 395 have elongated openings similar to 173 and are fastened to the sides 360 and 361 by means of screws, not shown. Screws similar to 175 adjustably support the angle irons 395.

Figures 18, 19, 20:
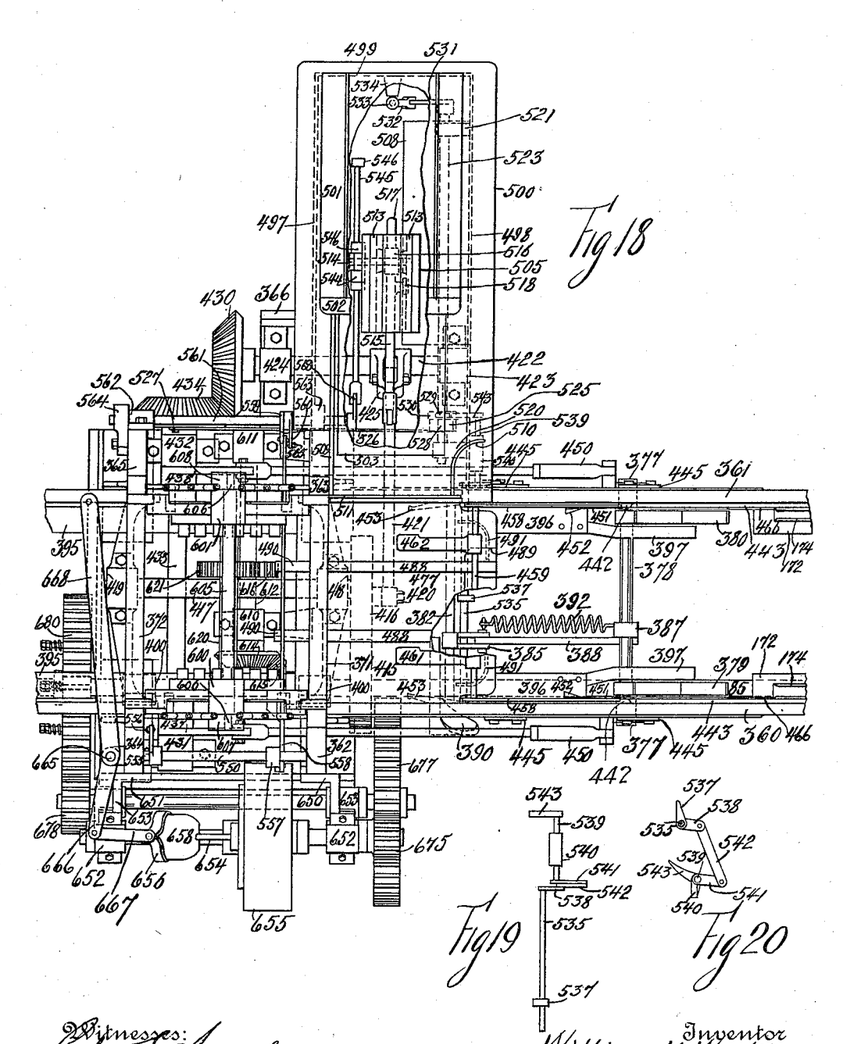
Fig. 18 shows an enlarged partial top plan view of the central portion of the machine.
Fig. 19 represents an elevation of some details.
Fig. 20 shows a bottom view of Fig. 19.

The main driving shaft 85 is journaled in bearings 400 formed in the columns 362 and 364. The shaft 85 carries a spur gear 415 similar to 115 which meshes with the spur gear 416 similar to 116 fastened to the short longitudinal shaft 417. The shaft 417 is supported in journal brackets 418, 419 which are respectively fastened to the columns 362, 363 and 364, 365. A wrist pin 420 on the gear 416 supports one end of the connecting rod 421 (Fig. 18). A second short horizontal shaft 422 is supported in supporting boxes 423 and 424 which extend up from the bed plate 366. An arm 425 has one end fastened to the shaft 422. One end of the connecting rod 421 is pinned to the arm 425. A bevel gear 430 is fastened to one end of the shaft 422. Supporting boxes 431, 432 have supported therein the short cross shaft 433. A bevel gear 434 fastened to the shaft 433 meshes with the bevel gear 430. By means of the connections interposed between the main shaft 85 and the shafts 422 and 433 an oscillating movement is given to the latter two shafts, from the rotations of the former. Levers 437 and 438 have each one end fastened to the cross shaft 433. Cross heads 442 bear on shelves 443 formed with the horizontal sides 360 and 361. The cross heads 442 have projections that extend through the longitudinal 443 formed with the horizontal sides 360 Plates 445 are bolted to said projections to maintain the cross heads 442 laterally in position. Connecting rods 450 at one end are pinned to the arms 437, 438 and the other ends of said connecting rods are pinned to the cross heads 442. On the cross heads 442 are pivoted the pushers 451 with the lugs 452 and the pushers 453.

The pushers 451 and 453 are pivoted to the cross heads 442 by pins similar to 153 and 154. The pushers 451 and 453 have heels similar to 155 and springs similar to 153 bear between said pushers and the cross heads 442. Each of the cross heads 442 carries an angle shaped arm 458 similar to 158 that carries the cross rod 459. Pushers 461 and 462 are hinged to the cross rod 459. Each of the pushers 461 and 462 has extending from its lower surface a toe 463. The said toes are in line with the ends of the pushers 453. A pair of guide plates 466 are fastened to the sides 360 and 361. Guide plates similar to 167 are fastened to the guide plates 367 in line with the guide plates 466. A hood with the crown 477 similar to 177 is pivoted to the sides 360 and 361, by means of screws 479 similar to 179. A supporting bar 480 similar to 180 is supported in the sides 360, 361.

Figure 3:
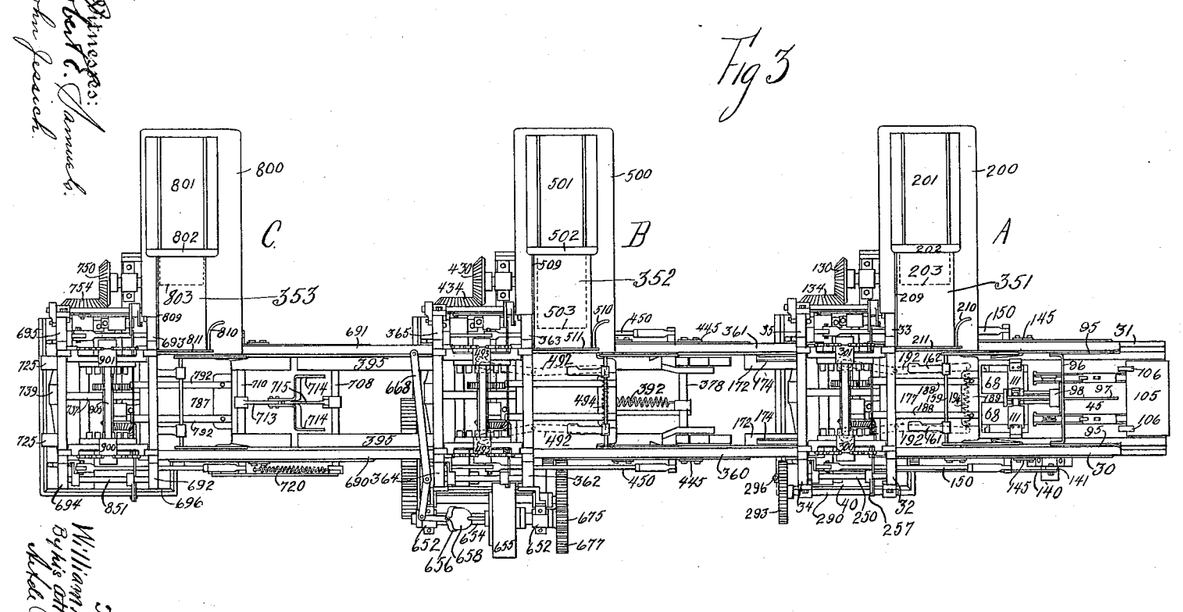
Fig. 3 shows a partial top plan view of Fig. 1.

By means of the bar 480 the hood with the crown 477 can be tipped to different positions. A supporting bar not shown similar to 187 is fastened to and extends between the columns 362 and 363. Spring guide bars 488 have each one end bearing on a separator 489, located upon the crown 477. The other ends of the bars 488 are curved as indicated at 490. Curved guide lugs 491 similar to 191 extend from the lower face of the crown 477. A pair of separator arms 492 are pivoted to the crown 477 and have each journaled at their ends the guide rollers 493 (Fig. 3). The other ends of the arms are connected by the spring 494.

A cross feed table is shown with the sides 497, 498 and end wall 499 upon which is mounted the table plates 500 similar to 200. A hood 501 with the apron 502 respectively similar to 201 and 202 is fastened to the table plate 500, and is concaved from its lower face for the pusher plate 503. A cross head 505 similar to 205 extends from the pusher plate 503. A guide plate 508 is connected to the side 498 of the feed table. On the table plate 500 is located a hopper with the side plates 509 and 510, the latter being curved as shown. An end plate 511 forming an opening similar to 212 with the table plate 500 is connected to the side plates 509 and 510.

With the cross head 505 are formed lugs 513 which support a pin 514. At the upper end of the arm 425 is pinned one end of the link 515 with the hook end 516 having the prong 517. A roller 518 is journaled on the link 515. The hook end 516 normally engages the pin 514 of the cross head 505. With the side 498 are formed bearings 520 and 521, in which is journaled the shaft 523. On the latter is loosely mounted a lever 524, having a boss 525. A link 526 connects the lower end of the lever 524 with a pin 527 on the bevel gear 434. A lug 528 extends from the boss 525 and the latter has pivoted thereto a spring latch 529 similar to 229. A heel 530 similar to 230 is fastened to the shaft 523 and can be engaged by the latch 529, so that an oscillating movement can be transmitted from the bevel gear 434 to the shaft 523, when the latch 529 engages the heel 530. An arm 531 has one end fastened to the shaft 523, and to the swinging end of said arm is pinned the plunger 532 having the cap 533. The plunger 532 is guided in the guide bracket 534 extending from the end wall 499. The plunger 532 is in the path of the prong 517. A spindle 535 is pivoted in the sides 360 and 361. A regulating finger 537 extends from the spindle 535. One end of a lever 538 is fastened to the spindle 535. A rock shaft 539 is fulcrumed in a bearing 540 that extends from the side 498. A lever 541 extends from the shaft 539 (Figs. 19 and 20). A link 542 connects the other ends of the levers 538 and 541. A finger 543 is also fastened to the rock shaft 539 and its swinging end is in the path of the latch 529.

An oscillating bearing 544 is supported on the pin 514 and slidably carries the plunger 545. Stop collars 546 are fastened to the plunger 545.

A nail feeder 547 with the oscillating feed pan 548 similar to 246 and 247 is mounted on the guide columns 362, and 364. A short horizontal shaft 550 is supported in bearings extending from the columns 362 and 364. An arm 555 is fastened to the shaft 550 and has one end of the vertical link 556 pinned thereto, the other end of which latter is connected to the mechanism (not shown) of the nail feeder 547. A second arm 557 is fastened to the shaft 550 and has fastened thereto one end of the link 558. The other end of the latter is fastened to the arm 559 of a bell crank, which has a second arm 560. The bell crank having the arms 559 and 560 is fastened to the shaft 561, which latter is supported in the bearings 562 and 563. A friction block 564 is supported on the column 365 and tightly clamps one end of the shaft 561. A vertical link 565 has one end pinned to the arm 560 and the other end of the link is connected to the mechanism (not shown) of the nail feeder (not shown), which latter is supported on the columns 363, 365. The latter nail feeder is similar to 248. An arm 568 is fastened to the shaft 561 and has pinned thereto one end of the plunger 545.

An arm 577 is fastened to the shaft 275 and has connected thereto one end of the rope 580 and a second rope (not shown) similar to 281. A pulley 582 is journaled in a hanger 583 and a second pulley (not shown) similar to 284 is journaled in a hanger (not shown) similar to 285. The rope 580 extends over the pulley 582 and has one end fastened to the oscillating feed pan 548. The oscillating pan opposite 548 is connected up in a similar manner.

A cross head 600 is guided in the columns 362 and 364 and a cross head 601 is guided in the columns 363 and 365. A shaft 605 connects the said cross heads 600 and 601, and has at its ends eccentric bearings 606 for the upper ends of the connecting rods 607 and 608.

A pair of journal bearings 610 and 611 are supported on the bed plate 366 and have journaled therein the shaft 612. A bevel gear 614 on the shaft 612 meshes with the bevel gear 615 on the main shaft 85. A spur gear 616 is fastened to the shaft 612. A shaft 620 is journaled similar to 320 and has fastened thereto the spur gear 621 which meshes with the spur gear 616. Arms like 622 are fastened to the shaft 620 and have their outer ends pinned to the connecting rod 607 and 608.

Pairs of slides 625, 626 are guided respectively on the columns 362, 364 and on the columns 363, 365. Each pair of slides are connected by a cross bar 628, and the latter have fastened thereto the series of nail holders 630. Guide strips 635 bear up against the lower surface of each series of nail holders 630, and are fastened at their ends to the pairs of slides 625, 626 constituting floating guides for the sides of the box to be made. Guide strips 636 are connected to the slides 625, 626. One of the guide strips 636 is securely fastened to the slides 625, and 626, while the other guide strip 636 is fastened to an angle shaped lever 637, similar to 337, by which the ends and sides of the boxes are adjustably guided. Guides similar to 340 and 341 extend from each of the slides 625 and 626 and are connected to the guide strip 635. A channel 642 similar to 342 is fastened to each cross head 600 and 601 and from which are suspended punches similar to 343. The lower ends of the latter punches enter the nail holders 630. Nail feeding conduits 645 extend from the feeder 547 and the nail feeder opposite thereto and connect with the nail holders 630.

Brackets 650, 651 respectively have the bearings 652, 653 supported on the columns 362, 354. A short horizontal shaft 654 is journaled in the bearings 652 and has fastened thereto a friction clutch with the pulley 655. An operating lever 656 pivoted at one end, to an auxiliary bracket 657 extending from the bracket 651, at about its central portion is pivoted to the movable member 658 of the friction clutch. A vertical shaft 665 is journaled in bearings extending from the column 364 and has fastened thereto an arm 666. A link 667 connects the arm 666 with the lever 657. An arm 668 is fastened to the upper end of the shaft 665 and is pinned to an arm 669 extending from the operating bar 670. The latter is suspended by means of chains or ropes 671. To the shaft 654 is also fastened the spur gear 675. A shaft 676 is journaled in the bearings 653 and has fastened thereto the spur gear 677, which meshes with the spur gear 675. The shaft 676 has also fastened thereto the spur gear 678 which meshes with a frictional spur gear 680 supported on the main shaft 85. The office of the frictional spur gear 680 is to prevent breakage when the machine is clogged. The rotations of the shaft 654 are transmitted to the gear 680 through the interposed parts and in case the machine is overloaded for any reason, slippage would occur between the gear 680 and the friction clutch with the pulley 655 in case the members of the friction clutch remained in operative contact.

The unit B operates upon the ends 350 and sides 351 which have been nailed together by the unit A. The said nailed portions are moved by the fingers 152 on the channel irons 174. They land upon the turning fingers 379 and 380 and are thereby partially tipped. The turning fingers 379 and 380 are swung by virtue of the cam 390 actuating the roller 386, which latter in turn moves the arm 385. The link 388 is moved by the arm 385, and said link swings the arm 387, which latter partially turns the shaft 378. By virtue of the latter the fingers 379 and 380 land the nailed portion of the uncompleted box upon the flanges 396 of the angle irons 395. Thereby the open ends of the partially nailed portions of the boxes are located upwardly. The pushers 451 move the said portions opposite the pusher plate 503. The pushers 451 are moved by virtue of the reciprocation of the cross heads 442. The latter are moved in a manner similar to the cross heads 142. Upon the return strokes of the cross heads 442, that is to say, toward the charging end of the machine, the pusher plate 503 (see Fig. 2) moves the sides 352 over the ends 350 opposite the sides 351. The pusher plate 503 reciprocates with the cross head 505. The cross head 505 receives its movements by virtue of the hook end 516 engaging the pin 514. On the next forward stroke of the cross heads 442, the end boards 350 are engaged by the pushers 453 and are brought under and below the guide strips 635. At the same time the pushers 461 and 462 engage the side board 352 to locate it over the end boards 350. At the same time the guide strips 636 adjustably guide the sides 352 and ends 350 in proper position. The rollers 493 bear against the inner faces of the ends 350 and locate them in proper position for nailing. The side board 351 during its movement resulting from the pushers 451 strikes the regulating finger 537, which causes the finger 543 and interposed elements to actuate the plunger 532 in manner similar to that resulting from the coaction of the finger 237 and the plunger 233 with their interposed elements. In case no nailed portion with the side 351 and ends 350 is fed to engage the regulating finger 537, the plunger 532 is actuated and thereby no side board 352 is fed avoiding accident thereby.

During the movements of the oscillating bearing 544, the nails are fed through the conduits 645 in a manner similar to that described for the conduits 345. The nails reach the nail holders 630 and the sides 352 are nailed to the ends 350 as described for the sides 351 and end 350.

When the cross head 505 does not reciprocate, the oscillating bearing 544 remains stationary and the nail feeding mechanism of the unit B remains inoperative.

The third unit indicated in its entirety by the letter C is shown with the horizontal sides 690, 691 similar to 30, 31, which are respectively connected to the guide columns 364 and 365. The sides 690, 691 at their other ends are respectively connected to guide columns 692, 693 similar to 32 and 33. A sixth pair of guide columns are indicated at 694, 695. The columns 692 to 695 are bolted to a bed plate 696. A plate 697 similar to 36 connects the columns 692, 694 and a plate 698 similar to 37 connects the columns 693 and 695. A cross brace 701 connects the columns 692 and 693, and a cross brace 702 connects the columns 694, 695. The shaft 85 is continued for the third unit C by means of the coupling 705. Bearings 706 are formed with the columns 692, 694 and support the main shaft 85.

Journal brackets 707 are connected to the sides 690, 691 and support a rock shaft 708, having extending therefrom the bifurcated arm 709. A rock shaft 710 is journaled in the bearing 711 and 712. The latter shaft has fastened thereto the arm 713 with the angular pusher fingers 714. A link 715 connects the arms 709 and 713. To one end of the shaft 708 is connected the arm 716. To the side 690 is pivoted the bifurcated arm 717, which has journaled therein the roller 718. A link 719 connects the arms 716 and 717. A spring 720 has one end fastened to the arm 716 and the other end thereof is fastened to the floor. A cam 721 is fastened to the shaft 85 and bears against the roller 718. A pair of angle irons 725 are fastened to the horizontal sides 690 and 691. The vertical flange of each of the latter angle irons is cut away leaving the horizontal flange 726, which is bent down at its forward or charging end. The angle irons 725 have elongated openings similar to 173 and are fastened to the sides 690 and 691 by means of screws, not shown. Screws 727 similar to 175 adjustably support the angle irons 725. The screws 727 are threaded in the lugs 728 extending from the plates 697, 698, and have jam nuts 729 to lock them in different positions.

The shaft 85 carries a spur gear 735, similar to 115 which meshes with the spur gear 736 similar to 116, fastened to the short longitudinal shaft 737. The latter shaft is supported in journal brackets 738, 739, which are respectively fastened to the columns 692, 693 and 694, 695. A wrist pin 740 on the gear 736 supports one end of the connecting rod 741. A second short horizontal shaft 742 is supported in supporting boxes 743 and 744, which extend up from the bed plate 696. An arm 745 has one end fastened to the shaft 742. One end of the connecting rod 741 is pinned to the arm 745. A bevel gear 750 is fastened to one end of the shaft 742. Supporting boxes 751, 752 have supported therein the short cross shaft 753. A bevel gear 754 fastened to the shaft 753 meshes with the bevel gear 750. By means of the connections interposed between the main shaft 85 and the shafts 742 and 753 an oscillating movement is given to the latter two shafts, from the rotations of the former. Levers 757 and 758 have each one end fastened to the cross shaft 753. Cross heads 762 bear on shelves 763 formed with the horizontal sides 690 and 691. The cross heads 762 have projections that extend through the longitudinal openings 764 of the sides 690 and 691. Plates 765 are bolted to said projections to maintain the cross heads 762 laterally in position. Connecting rods 770 at one end are pinned to the arms 757, 758 and the other ends of said connecting rods are pinned to the cross heads 762. On the cross heads 762 are pivoted pushers 771 and 772.

The pushers 771, 772 are pivoted to the cross-heads 762 by means of pins similar to 153 and 154. The said pushers 771 and 772 have heels similar to 155 and springs similar to 153 bear between said pushers and the cross heads 762. Each of the cross heads 762 carries an angle shaped arm 778 similar to 158, that carries the cross rod 779. Pushers 781 and 782 are hinged to the cross rod 779. Each of the pushers 781 and 782 has extending from its lower surface a toe similar to 163. The latter toes are in line with the ends of the pushers 771 and 772. Guide strips 783 are fastened to the sides 690 and 691 and extend in front of the plates 697 and 698. A spring 784 bears between one of the guide strips 783 and the plate 697. A guide strip 785 is supported on the plates 697, 698. A spring 786 bears between one of the guide strips 785 and the plate 697.

A hood with the crown 787, similar to 177, is pivoted to the sides 690 and 691, by means of screws 789 similar to 179. A supporting bar 790 similar to 180 is supported in the sides 690, 691. By means of the bar 790 the hood with the crown 787 can be tipped to different positions. A supporting bar 791 similar to 187 is fastened to and extends between the columns 692 and 693. Spring guide bars 792 have each one end bearing on a separator 793, located upon the crown 787. The other ends of the bars 792 are curved as indicated at 793.

A cross feed table is shown with the sides 797, 798 and end wall 799 upon which is mounted the table plate 800 similar to 200. A hood 801 with the apron 802, respectively, similar to 201 and 202, is fastened to the table plate 800, and is concaved from its lower face for the pusher plate 803. A cross head 805 similar to 205 extends from the pusher plate 803. A guide plate 808 is connected to the side 798 of the feed table. On the table plate 800 is located a hopper with the side plates 809 and 810, the latter being curved as shown. An end plate 811 forming an opening similar to 212 with the table plate 800, is connected to the side plates 809 and 810.

Figures 21, 22, 23:
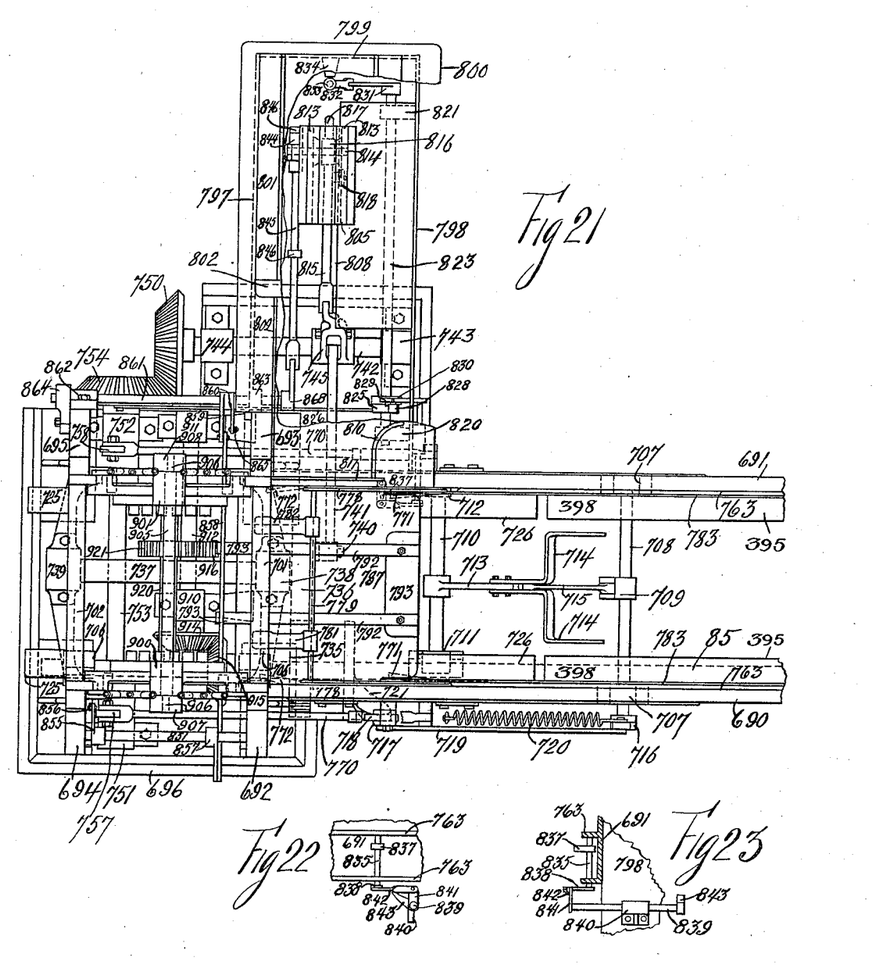
Fig. 21 represents an enlarged partial top plan view of the discharging end of the machine.
Fig. 22 shows some details of Fig. 21.
Fig. 23 shows a right hand end view of Fig. 22
Figure 24:
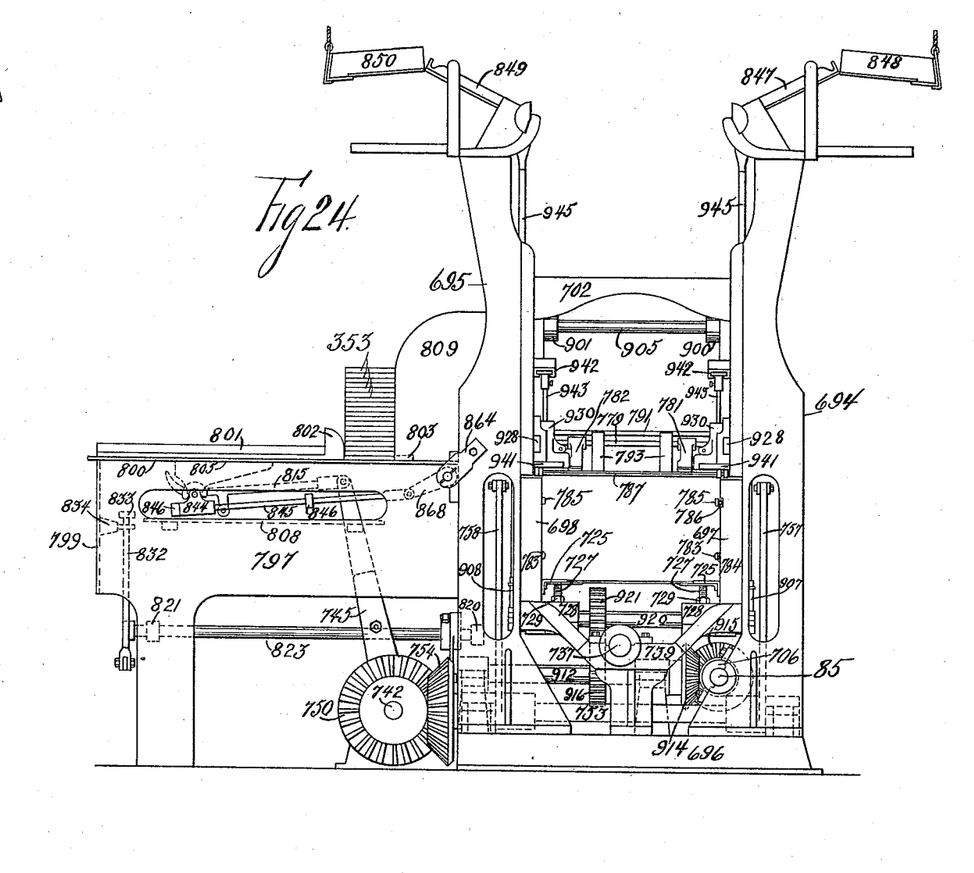
Fig. 24 shows an enlarged left hand end view of Fig. 1.

With the cross head 805 are formed lugs 813 which support a pin 814. At the upper end of the arm 745 is pinned one end of the link 815 with the hook end 816 having formed therewith the prong 817. A roller 818 is journaled on the link 815. The hook end 816 normally engages the pin 814 of the cross head 805. With the sides 798 are formed bearings 820 and 821, in which is journaled the shaft 823. On the latter is loosely mounted a lever 824 having a boss 825. A link 826 connects the lower end of the lever 824 with a pin 827 on the bevel gear 754. A lug 828 extends from the boss 825, and the latter has pivoted thereto a spring latch 829 similar to 229. A heel 830 similar to 230 is fastened to the shaft 823 and can be engaged by latch 829, so that an oscillating movement can be transmitted from the bevel gear 754 to the shaft 823, when the latch 829 engages the heel 830. An arm 831 has one end fastened to the shaft 823, and to the swinging end of said arm is pinned the plunger 832 having the cap 833. The plunger 832 is guided in the guide bracket 834 extending from the end wall 799. The plunger 832 is in the path of the prong 817. A spindle 835 is pivoted in the shelves 763 of the side 691. A regulating finger 837 extends from the spindle 835. One end of a lever 838 is fastened to the spindle 835. A rock shaft 839 is fulcrumed in a bearing 840, that extends from the side 798. A lever 841 extends from the shaft 839 (Figs. 22 and 23). A link 842 connects the other ends of the levers 838 and 841. A finger 843 is also fastened to the rock shaft 839, and its swinging end is in the path of the latch 829.

An oscillating bearing 844 is supported on the pin 814 and slidably carries the plunger 845. Stop collars 846 are fastened to the plunger 845.

A nail feeder 847 with the oscillating feed pan 848 similar to 246 and 247 is mounted on the guide columns 692 and 694. A nail feeder 849 with the oscillating feed pan 850 is mounted on the columns 693, 695. A short horizontal shaft 851 is supported in bearings extending from the columns 692 and 694. An arm 855 is fastened to the shaft 851 and has one end of the vertical link 856 pinned thereto, the other end of which latter is connected to the mechanism (not shown) of the nail feeder 847. A second arm 857 is fastened to the shaft 851 and has fastened thereto one end of the link 858. The other end of the latter is fastened to the arm 859 of a bell crank which has a second arm 860. The latter bell crank is fastened to the shaft 861, which is supported in the bearings 862 and 863. A friction block 864 is supported on the column 695 and tightly clamps one end of the shaft 861.

A vertical link 865 has one end pinned to the arm 860, and the other end of the link is connected to the mechanism (not shown) of the nail feeder 849, which latter is supported on the columns 693, 695. An arm 868 is fastened to the shaft 861 and has pinned thereto one end of the plunger 845. An arm 877 is fastened to the shaft 275 and has connected thereto one end of the rope 880, and a second rope (not shown) similar to 281. A pulley 882 is journaled in a hanger 883 and a second pulley (not shown) similar to 284 is journaled in a hanger (not shown) similar to 285. The rope 880 extends over the pulley 882 and has one end fastened to the oscillating feed pan 848. The oscillating pan 850 is connected up in a similar manner.

A cross head 900 is guided in the columns 692 and 694, and a cross head 901 is guided in the columns 693 and 695. A shaft 905 connects the said cross heads 900 and 901, and has at its ends eccentric bearings 906 for the upper ends of the connecting rods 907 and 908.

A pair of journal bearings 910 and 911 are supported on the bed plate 696 and have journaled therein the shaft 912. A bevel gear 914 on the shaft 912 meshes with the bevel gear 915 on the main shaft 85. A spur gear 916 is fastened to the shaft 912. A shaft 920 is journaled in bearings formed in the lugs 728, and has fastened thereto the spur gear 921 which meshes with the spur gear 916. Arms like 922 are fastened to the shaft 920 and have their outer ends pinned to the connecting rods 907 and 908.

Pairs of slides 925, 926 are guided respectively on the columns 692, 694 and on the columns 693, 695. Each pair of slides are connected by a cross bar 928, and the latter have fastened thereto the series of nail holders 930. Guide strips 935 bear up against the lower surface of each series of nail holders 930, and are fastened at their ends to the pairs of slides 925, 926, constituting floating guides for bottom of the box to be made. Guide strips 936 are connected to the slides 925, 926. One of the guide strips 936 is securely fastened to the slides 925 and 926, while the other guide strip 936 is fastened to an angle shaped lever 937, similar to 337, by which the partially finished sides, ends and bottom of each box are adjustably guided. Guides like 941 similar to 341 extend from each of the slides 925 and 926 and are connected to the guide strip 935. A channel 942 similar to 342 is fastened to each cross head 900 and 901, and from which are suspended punches 943. The lower ends of the latter enter the nail holders 930. Nail feeding conduits 945 extend from the feeders 847 and 849 and connect with the nail holders 930.

Upon the cross braces 41, 42—371, 372—701, 702 is supported a floor 950, that has connected thereto a ladder 951, and hand rails 952.

The unit C nails the bottoms 353 to the ends and sides of the uncompleted box. The uncompleted box as it leaves the unit B moves along the angle irons 395 until it lands on the bent portions of the horizontal flanges 726 where it is partially tipped. The pusher fingers 714 next engage the uncompleted box and simultaneously tips and moves it to the angle irons 725 where it is located in proper position to be engaged by the pusher 771. The fingers 714 move by virtue of rotations of the cam 720, which actuates the connections between said cam and fingers. The pushers 771 move said uncompleted box opposite the pusher plate 803. The pushers 771 are moved by virtue of the reciprocations of the cross heads 762. The latter are moved in a manner similar to the cross heads 142. Upon the return strokes of the cross heads 762 the pusher plate 803 moves the bottoms 353 over the ends 350 and sides 351, 352. The pusher plate 803 reciprocates with the cross head 805. The latter receives its movements by virtue of the hook end 816 engaging the pin 814. On the next forward stroke of the cross head 762, the uncompleted box having the ends 350 and sides 351, 352 is brought under the guide strips 935. At the same time the pushers 781, 782, engage the bottom 353 to locate it over the other portion of the uncompleted box. At the same time the guide strips 936 adjustably guide the sides 351, 352 and ends 350 of the box and the bottoms 353 in proper position. One of the end boards 350 during its movement strikes the regulating finger 837, which causes the finger 843 and interposed elements to actuate the plunger 832 in a manner similar to that resulting from the coaction of the finger 237 and the plunger 233 with their interposed elements. In case no nailed portion with the sides 351, 352 and end 350 is fed to engage the regulating finger 837, the plunger 832 is actuated and thereby no bottom is fed, avoiding accident.

During the movements of the oscillating bearing 844, the nails are fed through the conduits 945 in a manner similar to that described for the conduits 345. The nails reach the nail holders 930 and the bottoms 353 are nailed to the ends 350 as described for the sides 351 and ends 350. When the cross head 805 does not reciprocate, the oscillating bearing 844 remains stationary and the nail feeding mechanism of the unit C remains inoperative.

Having described my invention what I desire to secure by Letters Patent and claim is:

1. In a machine of the character described, the combination of a reciprocating cross head to feed the members of a box in the machine, an oscillating shaft in the machine, an arm loosely supported on said shaft, a locking pin extending from said arm, a collar fastened to said shaft, a sleeve having a lug with a cavity located between said collar and said arm, flexible means to normally lock said pin with said cavity, and connecting means between the arm and the cross head.

2. In a machine of the character described, the combination of means to feed members of a box and automatically operated flexible means to tip said members.

3. In a machine of the character described, the combination of means to feed members of a box, tipping doors hinged in the machine to tip said members into proper position and flexible means to tip the doors.

4. In a machine of the character described, the combination of means to feed a pair of box members in said machine, a pair of tipping doors hinged in said machine to tip said box members from a horizontal to a vertical position, a spring actuated link for each of said doors with one end thereof pivoted thereto and means coacting with said springs to tip said doors.

5. In a machine of the character described, the combination of means to feed a pair of box members in said machine, a pair of tipping doors hinged in said machine to tip said box members from a horizontal to a vertical position, a pair of spring actuated links pivoted to the doors, a swinging lever in said machine, and lugs pivoted on opposite sides of one end of said lever and engaging the swinging ends of said links.

6. In a machine of the character described, the combination of a pair of tipping doors hinged therein to tip a pair of box members from a horizontal to a vertical position, a swinging lever with one end pivoted in said machine, a link for each door with one end pivoted thereto, a collar fastened to each of said links, a spring surrounding each link with one end thereof bearing against its collar, and lugs pivoted on the opposite sides of the swinging end of said lever, the other ends of the springs bearing against said lugs, the combination of elements enabling the lever to swing when the doors are prevented from tipping.

7. In a machine of the character described, the combination of a pair of tipping doors hinged therein to tip a pair of box members, and a pair of swinging guide arms pivoted in the machine in the path of said members when they are tipped to automatically maintain said box members in their vertical positions.

8. In a machine of the character described, the combination of means to horizontally feed a pair of members of a box, means to tip said box members from their horizontal to vertical positions, means to move said box members after being tipped to their vertical positions, and means to feed a third box member in proper position for the first two box members preparatory to securing them together.

9. In a machine of the character described, the combination of a pair of separator arms pivoted therein, a spring connecting corresponding ends of the arms, and a roller journaled in the other end of each arm to bear against a pair of members of a box.

10. In a machine of the character described, the combination of a cross feed mechanism comprising a pusher plate to locate a member of a box to be made over a pair of other members of the same, means to reciprocate said pusher plate, a regulating finger in the path of one member of the said pair of members, and mechanism connected between said finger and the said means to disengage the latter from the pusher plate when the said finger is not actuated by the member of the box coacting therewith.

11. In a machine of the character described, the combination of a cross feed mechanism comprising a pusher plate to locate a member of a box over a pair of other members of the same, a swinging arm in the machine, a pin for and reciprocating with the pusher plate, a link having a hook end with one end pinned to said arm and the hook end normally engaging the pin of the pusher plate, a regulating finger in the machine in the path of one of the members of the box to be made, and means connected between said finger and said hook end to disengage the latter from the pin of the cross head when the regulating finger is not moved by the member of the box coacting therewith.

12. In a machine of the character described, the combination of a cross feed mechanism comprising a pusher plate to locate a member of a box over a pair of other members of the same, a swinging arm in the machine, a cross head extending from the pusher plate, lugs extending from the cross head, a pin supported in said lugs, a link with a hook end and prong having one end pinned to said swinging arm and the hook end normally engaging the pin of the cross head, a plunger in the path of said prong, a regulating finger in the path of a member of said box, and elements connected between said finger and said plunger so as to maintain said plunger in its lowered position, by virtue of the coaction of the regulating finger and the member of the box in the path of which it is located.

13. In a machine of the character described, the combination of a cross feed mechanism comprising a pusher plate to locate a member of a box over a pair of other members of the same, an adjustable hood in the machine in line with the cross feed mechanism, and spring guide bars over the hood and separated therefrom, one end of each guide bar connected to the hood and the other end fastened to an adjacent portion of the machine, the guide bars separated from the top face of the hood a sufficient distance to enable the member of the box actuated by the cross feed mechanism to be pushed between the said guide bar and the said hood.

14. In a machine of the character described, the combination of a nail feeder, a pusher plate to feed one of the members of a box, means to reciprocate the pusher plate, said means being automatically detachable from the plate, and connections between the pusher plate and the nail feeder.

15. In a machine of the character described, the combination of a nail feeder, a pusher plate to feed one of the members of a box, means to reciprocate the pusher plate, a bearing moving with the pusher plate, a plunger guided in said bearing, a pair of stop collars on the plunger for the bearing to abut against, a nail feeder in the machine, and connections between said feeder and said plunger.

16. In a machine of the character described, the combination of a nail feeder, a pusher plate to feed one of the members of a box, automatically detachable means to reciprocate the pusher plate, means to feed two other members of the box to be made in the machine, one of the latter members controlling the reciprocations of the said pusher plate, a nail feeder for the machine, and connections between the nail feeder and the pusher plate.

17. In a machine of the character described, the combination of means for feeding a pair of members for a box, means for feeding another member of the same over the said pair of members, and a nail feeder for the machine, the feeding of the said pair of members controlling the said means for feeding the said other member, the means for feeding the latter member controlling the operations of the nail feeder.

18. In a machine of the character described, the combination of means to nail three members of a box, turning fingers in the machine, means to swing the fingers and thereby turn the assembled members, and means to nail a fourth member to the said three members.

19. In a machine of the character described, the combination of an operating unit, means in said unit to nail together three members of a box, a second unit in the machine to nail a fourth member to the said three members, and turning fingers between said units to turn the first three members through an angle of one hundred and eighty degrees, while said three members of the box travel from the first unit to the second unit, the moving elements in both units being timed for the simultaneous opertion of both units.

20. In a machine of the character described, the combination of three units to nail together the members of a box, the three units simultaneously operating upon members of boxes as they are fed through the machine, turning fingers between the first and second units to turn the uncompleted boxes through an angle of one hundred and eighty degrees, and means between the second and third units to turn the uncompleted boxes through an angle of ninety degrees.

21. In a machine of the character described, the combination of a main driving shaft, a rock shaft pivoted in the machine, a pair of turning fingers extending from said rock shaft, an arm extending from the rock shaft, a second rock shaft pivoted in the machine, a bifurcated arm extending from the latter rock shaft, a roller pivoted to the swing end of the bifurcated arm, a cam on the driving shaft engaging said roller, a link with one end pinned to the bifurcated arm and its other end pinned to the arm extending from the first rock shaft, and a spring between the arm on the first rock shaft and the floor.

22. In a machine of the character described, the combination of a main driving shaft, a rock shaft pivoted in the machine, an arm with pusher fingers extending from the rock shaft, a second rock shaft pivoted in the machine, a bifurcated arm extending from the second rock shaft, a link connecting the latter arm with the arm having the pusher fingers, a second arm extending from the second rock shaft, a bifurcated arm with one end pivoted in the machine, a roller journaled in the bifurcated end of the latter arm, a link connecting the latter arm and the second arm of the second rock shaft, and a cam on the main driving shaft engaging said roller.

23. In a machine of the character described, the combination of a plurality of units, means in each unit for feeding the members of a box in the longitudinal direction of the machine, individual cross feeding means for box parts connected to each of the units, nailing means for said members in each unit, nail feeding means for the said nailing means, a platform extending over all of the units, a driving shaft for all of the units, a second shaft, connections between the two shafts, means on the second shaft to impart rotation thereto, an operating bar to start the machine extending over all the units of the machine, and connections between said bar and the means on the said shaft.

Signed at Bayonne, in the county of Hudson and State of New Jersey this first day of June A. D. 1914.

WILLIAM M. WAUTERS.

Witnesses:
A. A. DE BONNEVILLE,
H. C. COLVILLE.

Copies of this patent may be obtained for five cents each, by addressing the "Commissioner of Patents, Washington, D. C."